United States Patent [19]
Taylor

[11] Patent Number: 5,678,838
[45] Date of Patent: Oct. 21, 1997

[54] SEPARABLE DUAL TRAILER

[76] Inventor: John R. Taylor, 3350 Western Center Blvd. #274, Fort Worth, Tex. 76137

[21] Appl. No.: 504,528

[22] Filed: Jul. 20, 1995

[51] Int. Cl.$^6$ ........................................................ B60P 1/28
[52] U.S. Cl. ..................... 280/413; 280/415.1; 280/638; 414/483
[58] Field of Search ............................. 280/638, 656, 280/401, 404, 411.1, 412, 413, 414.1, 415.1, 418, 472, 476.1, 491.1, 789, 460.1, 467; 414/482, 483, 484, 485; 296/181, 182

[56] References Cited

U.S. PATENT DOCUMENTS

| | | | |
|---|---|---|---|
| 2,138,011 | 11/1938 | Myers | 280/413 |
| 2,153,876 | 4/1939 | Roseman | 280/412 |
| 2,178,467 | 10/1939 | Brent | 280/33.44 |
| 2,357,761 | 9/1944 | Peacock | 280/33.44 |
| 3,119,638 | 1/1964 | Sneed | 296/23 |
| 3,175,714 | 3/1965 | Wittek | 214/356 |
| 3,338,440 | 8/1967 | Donahue | 414/482 |
| 3,738,682 | 6/1973 | Ritter | 280/413 |
| 3,829,129 | 8/1974 | Newcomer | 280/476.1 |
| 4,051,967 | 10/1977 | Sedgwick | 414/483 |
| 4,113,273 | 9/1978 | Gates | 280/413 |
| 4,763,915 | 8/1988 | Risser | 280/413 |
| 5,244,221 | 9/1993 | Ward | 414/490 |
| 5,256,024 | 10/1993 | Ross | 280/656 |
| 5,265,898 | 11/1993 | Houck | 280/413 |

FOREIGN PATENT DOCUMENTS

2712203  9/1978  Germany ........................... 280/412

*Primary Examiner*—Anne Marie Boehler
*Attorney, Agent, or Firm*—Akin, Gump, Strauss, Hauer & Feld, L.L.P.

[57] ABSTRACT

A roadable semitrailer made up of individual trailers each having a trailer frame supported on spaced apart road wheels and a towbar for towing each trailer as a separate trailer unit. Each towbar is connected to the trailer frame by opposed brace members which may be reconnected to the towbar at spaced apart points to provide for moving the towbar between a substantially normal working position with respect to the axis of rotation of the wheels and an inclined working position for connection to a dual coupler for operating the trailer units side by side as a dual trailer. Alternatively, the individual trailer towbars may be removed and replaced by a common towbar for both trailers or a dual trailer towbar with spaced couplers may be interposed between a tow vehicle and the couplers of the separate trailer units. Transverse removable beams are adapted to interconnect the frames of each trailer unit when the trailer units are disposed side by side. The trailer is particularly useful for transporting plural recreational vehicles such as personal watercraft, snowmobiles or motorcycles, for example, wherein, occasionally, use of each vehicle at a different location, or use of only one vehicle is desired and the dual trailer may be separated for transport of each vehicle on its own trailer unit.

14 Claims, 8 Drawing Sheets

SEPARABLE DUAL TRAILER

FIELD OF THE INVENTION

The present invention pertains to a roadable semitrailer, particularly adapted for carrying two or more recreational vehicles and which may be converted into two separate trailers, each carrying one of the vehicles for transport to different destinations, for example.

BACKGROUND

There are myriad uses for relatively lightweight roadable semitrailers that may be towed by light duty trucks, sport utility vehicles and conventional passenger automobiles for transporting various types of cargo. One increasingly popular type of trailer is adapted to carry two recreational vehicles, disposed generally side by side on the trailer, such vehicles including, for example, snowmobiles, motorcycles and personal watercraft. These trailers are usually of a maximum legal road width to accommodate the cargo in a side by side transport mode. This maximum width is sometimes cumbersome to deal with when maneuvering the trailer and when storage of the trailer is required in a single vehicle garage or carport.

More importantly, perhaps, is the desire to often transport the trailer cargo, such as the aforementioned recreational vehicles, to different destinations in the event that one of the recreational vehicles is to be used by a first party in one location and the other recreational vehicle is desired to be used by another party in a different location, or only one vehicle is to be used at a given time. In such instances, a second trailer would normally be required to convey one of the vehicles to the alternate destination and would require transferring one of the vehicles to the second trailer. Moreover, in such instances, the maximum width trailer is now only required to carry one of the cargoes but its extra width must be contended with and its cargo is somewhat off center or off balance on the trailer, thereby increasing the difficulty of towing the trailer. This situation is aggravated in wide body trailers which have specialized supports for the cargo being carried, such as two side-by-side mounted personal watercraft. These types of recreational vehicles normally require special support rails on the trailer for supporting the watercraft during transport and to facilitate launching and retrieval of the watercraft.

Accordingly, there has been a strong desire and need to provide a trailer which may be used to transport two or more recreational vehicles of the type mentioned above, supported side-by-side on the trailer during usage which requires carrying both vehicles, and which trailer can be separated into two trailers for carrying one of the vehicles, each to different destinations, or for occasions when only one of the vehicles is to be used. It is to these ends that the present invention has been developed.

SUMMARY OF THE INVENTION

The present invention provides a unique separable dual trailer adapted to be towed behind a conventional motor vehicle and the like for transporting and storing cargo such as two or more recreational vehicles, which trailer may be separated into two trailers, each of which may be separately towable behind a motor vehicle to different destinations, or for occasions when only one of the vehicles and one of the trailers is required.

In accordance with one aspect of the present invention, a separable dual trailer is provided which includes two separate trailer frames, each supported by a set of rotatable road wheels and each trailer frame having means for supporting a cargo, such as a recreational vehicle or the like. The individual trailers may be identical and their frames may be interconnected by spaced apart transverse beams to cause the individual trailer frames to function as a single frame.

In accordance with another aspect of the invention, a dual trailer is provided which includes two separate trailer frames, each supported by an axle beam and spaced apart road wheels, which frames are interconnected and are also each provided with a towbar and brace arrangement whereby each trailer may have its own towbar and be connected to a tow vehicle for use by itself. Alternatively, the trailer towbars may be interconnected by a coupler and towbar extension member for connection at a single hitch to a tow vehicle. The individual trailer towbars may be pivotally connected to each trailer frame and releasably connected to opposed braces also connected to the respective trailer frames in such a way that the braces may be used in conjunction with the individual towbars to provide a rigid towbar connection for each trailer or the braces may be used to brace the individual towbars when they are connected to each other through a common single point towbar extension and coupler.

Alternate embodiments of the trailer include one with a trailer frame which includes a fixed brace member which may be interconnected to a pivotable towbar at alternate working positions of the towbar, an embodiment which includes a fixed brace and towbar combination which may be connected to the frame in alternate working positions for operation of the trailers as individual trailers or as the dual trailer, an embodiment which includes a fixed towbar and brace combination for connection to the frames of the individual trailers to operate as a dual trailer and an embodiment which utilizes a unique coupler and a towbar extension assembly which is adapted to be connected to fixed towbars and couplers of individual trailers for operation as the dual trailer.

In accordance with yet a further aspect of the present invention, a dual trailer is provided which may be converted from a wide bodied trailer to two individual relatively narrow bodied trailers and which is constructed in such a way as to facilitate easy conversion from a dual trailer unit to a pair of individual trailers. The trailers are particularly adapted for transporting cargo such as recreational vehicles, including personal watercraft, snowmobiles, motorcycles and various other types of cargo where it is sometimes desired to carry all of the cargo, that is both of the vehicles, behind one towing vehicle or simply leave part of the cargo parked, or towed to a different destination.

Those skilled in the art will further appreciate the above-mentioned features and advantages of the invention together with other superior aspects thereof upon reading the detailed description which follows in conjunction with the drawing.

DESCRIPTION OF PREFERRED EMBODIMENTS

In the description which follows, like parts are marked throughout the specification and drawing with the same reference numerals, respectively. The drawing figures are not necessarily to scale in the interest of clarity and conciseness.

Figure 1:
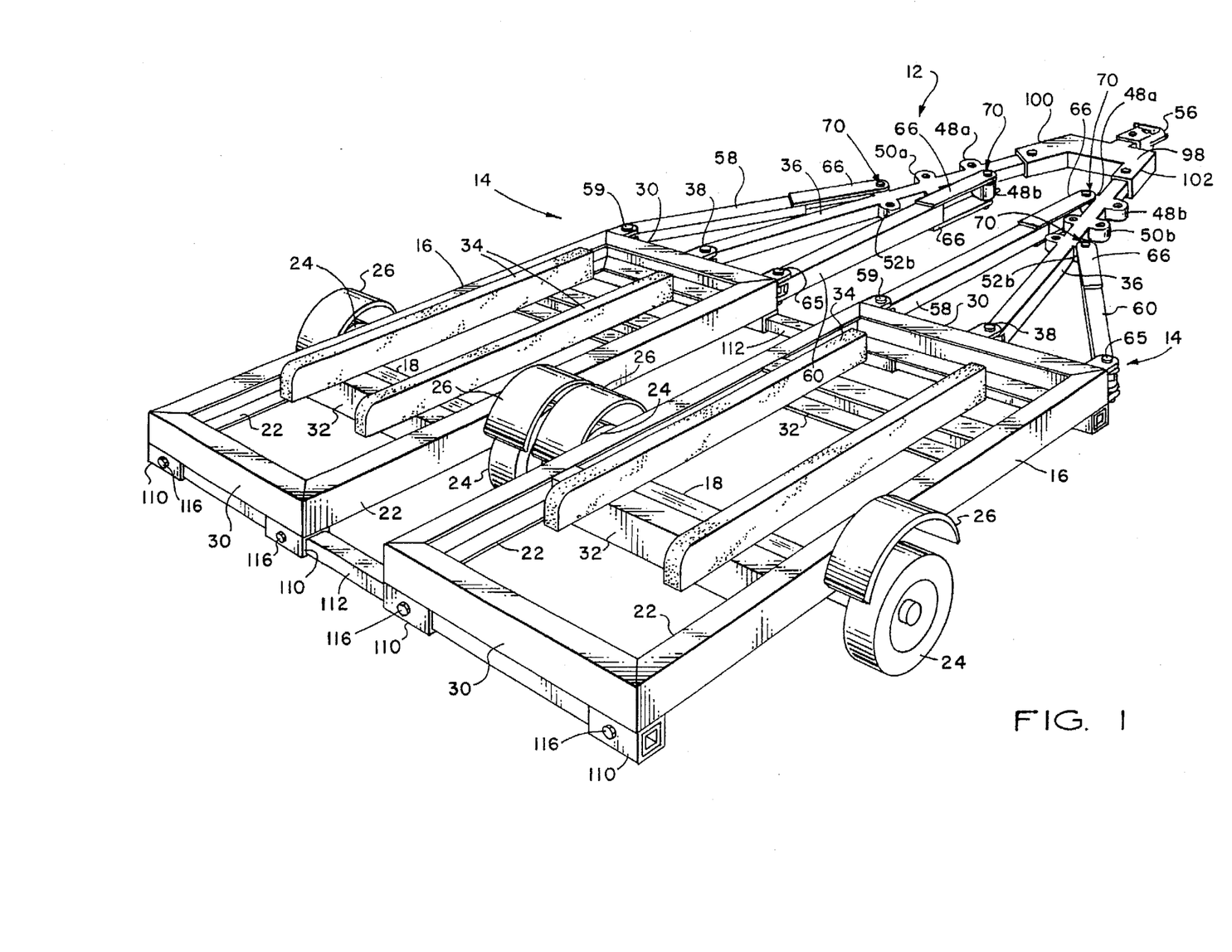
FIG. 1 is a perspective view of a separable dual trailer in accordance with the invention.
Figure 2:
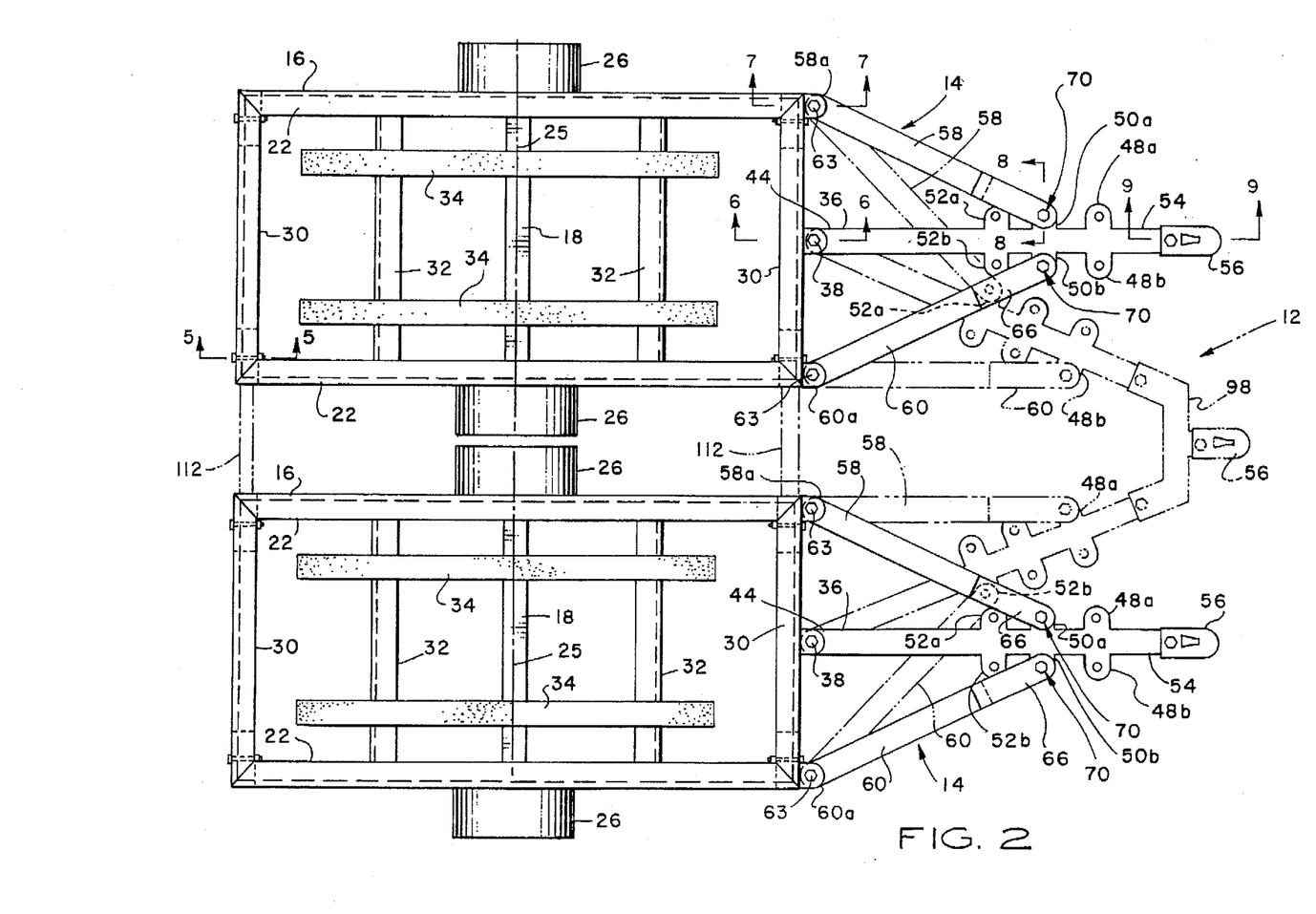
FIG. 2 is a top plan view of the trailer showing the individual trailers separated.

Referring to FIGS. 1 and 2, there is illustrated a unique, separable dual trailer in accordance with the invention and generally designated by the numeral 12. The dual trailer 12 comprises separable, substantially identical trailer units 14 which are disposed side by side in the arrangement illustrated in FIGS. 1 and 2 to function as a single trailer unit. Each oft he trailer units 14 is characterized by a suitable, generally rectangular perimeter frame 16 supported on an axle beam 18 by spaced apart conventional springs 20, one shown in FIG. 4. The exemplary leaf type springs 20 are suitably shackled to the axle beam 18 in a conventional manner and are connected at their opposite ends 20a and 20b, FIG. 4, to longitudinal frame members 22, respectively. The axle beam 18 supports conventional rotatable pneumatic tired road wheels 24 at opposite ends thereof on conventional spindles, not shown, for rotation about an axis 25, see FIGS. 2 and 3. Conventional fenders 26 are suitably connected to the frames 16 and disposed over at least a portion of the wheels 24, respectively.

Each frame 16 is made up of spaced apart longitudinal frame members 22 and opposed transverse end frame members 30 to form a generally rectangular perimeter type frame. Spaced apart intermediate transverse frame members 32 are also provided and support elongated spaced apart longitudinal rails or bunks 34 for supporting a recreational vehicle such as a snowmobile, personal watercraft or other cargo to be carried by each of the trailer units 14. The perimeter frame 16 may be made up of suitable structural metal members such as rectangular or square cross sectional tubing, channel or other conventional fabricated metal shapes. Conventional structural metal channel is illustrated as comprising the frame members 22, 30 and 32 and these members are preferably welded at their respective opposite ends to each other to form the perimeter frames 16. The leaf springs 20 are connected to the frame members 22 by conventional fittings.

Figure 6:
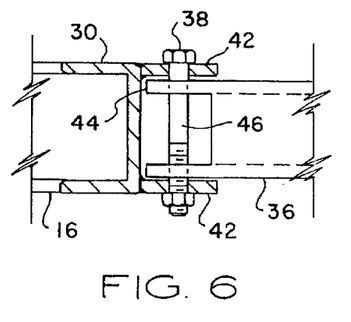
FIG. 6 is a detail view of one of the towbar-to-frame connections taken from line 6—6 of FIG. 2.

Each trailer unit 14 also includes an elongated tongue or towbar 36 pivotally connected to the forward transverse frame member 30 at a pivot connection 38 which includes, as shown in FIG. 6, a clevis disposed on the frame member 30 and characterized by spaced apart bracket parts 42. The end 44 of the towbar 36, adjacent the frame member 30, is bored to receive a pivot pin 46 characterized by a threaded bolt and nut assembly, as shown. The towbar 36 is also provided with spaced apart opposed pivot connection bosses 48a and 48b, 50a and 50b and 52a and 52b, FIG. 2. The pairs of pivot connection bosses 48a, 48b, 50a, 50b, 52a and 52b are spaced apart longitudinally along the towbar 36 between the end 44 and a distal end 54 which is adapted to be connected a conventional ball type coupler 56.

Figure 7:
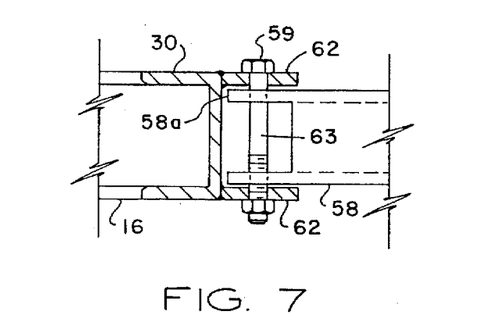
FIG. 7 is a detail view of one of the towbar brace-to-frame connections taken from line 7—7 of FIG. 2.

As further illustrated in FIG. 2, the towbars 36 of each trailer unit 14 are operable to be supported extending substantially normal to the forward transverse frame member 30 and axis 25 by opposed towbar brace members 58 and 60 which are each pivotally connected at one end 58a and 60a to the frame 16 at opposite ends of the forward transverse frame member 30, as shown. Referring to FIG. 7, by way of example, brace member 58 is connected at end 58a to a clevis type pivot connection including spaced apart bracket parts 62 disposed on the frame member 30. A threaded bolt and nut assembly type pivot pin 63 extends through the bracket parts 62 and through a suitable bore formed in the end 58a of the brace 58 to allow pivotal movement of the brace with respect to the frame 16 for a purpose to be described herein. The towbar braces 60 are similarly connected to the frames 16 at the opposite corners thereof, respectively, by pivot pins 63, as illustrated.

Figure 8:
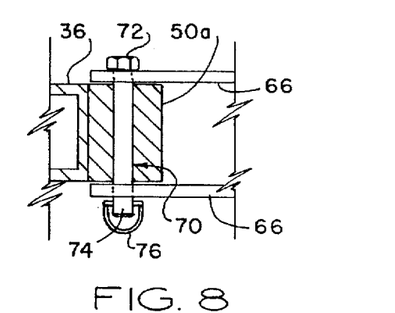
FIG. 8 is a detail view of one of the towbar brace-to-towbar connections taken from line 8—8 of FIG. 2.

FIG. 8 shows a typical connection between a brace member 58 or 60 and one of the bosses 48a, 48b, 50a, 50b, 52a or 52b. Each of the aforementioned connections is characterized by spaced apart elongated, clevis parts 66 formed on braces 58 and 60, respectively, see FIGS. 1, 3 and 4 also. The braces 58 and 60 are each connected to one of the bosses as shown in FIG. 8, by a pin 70 having a head portion 72, a distal end 74 and a suitable transverse bore for receiving a conventional retainer pin 76. The respective pins 70 are each retained at their associated connections for securing the braces 58 and 60 to the towbar 36.

Figures 9, 10:
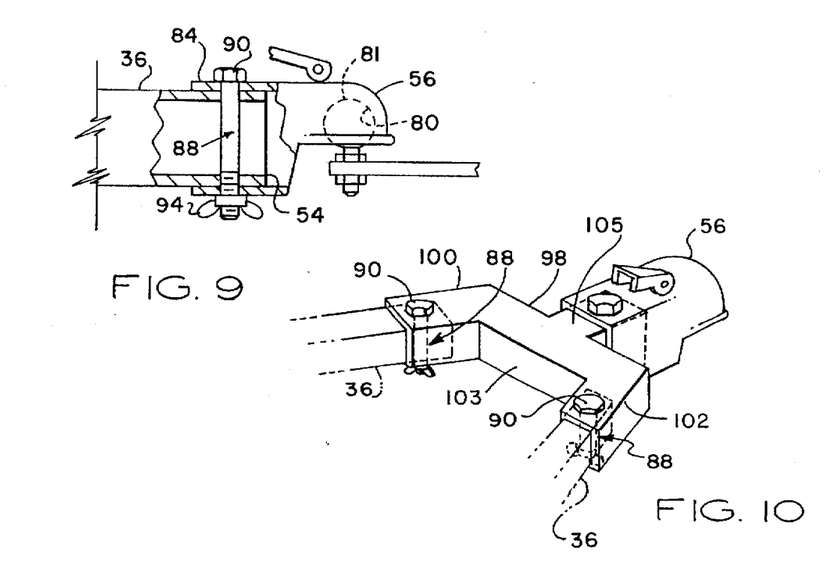
FIG. 9 is a detail view of one of the trailer coupler-to-towbar connections taken from line 9—9 of FIG. 2.
FIG. 10 is a detail perspective view of the dual coupler and towbar extension member.

Referring briefly to FIG. 9, each of the towbars 36 is operable to be connected at its distal end 54 to a coupler 56 in the manner illustrated. Each of the couplers 56 includes a socket portion 80 for receiving a conventional hitch ball 81 and a coupler retainer, not shown, operable to engage the ball to prevent disconnection of the coupler from the ball. The coupler 56 also includes a generally rectangular tubular sleeve portion 84 adapted to be sleeved over the distal end 54 of the towbar 36. Suitable bores are formed in the sleeve portion 84 and the distal end 54 of the towbar 36 to receive a retaining pin 88 having a suitable head portion 90 and a threaded distal end for receiving a nut 94 thereon. Accordingly, the coupler 56 may be detachably connected to the towbar 36 for use of the trailer unit 14 as a single trailer when the towbar is connected to the braces 58 and 60 in the manner shown by the solid lines in FIG. 2.

Alternatively, the trailer units 14 may be connected together to form the separable dual trailer 12 by disconnecting the brace members 58 and 60 from their connections at the bosses 50a and 50b of each towbar 36 and reconnecting the braces 58 and 60 of one of the trailer units to bosses 52b and 48a, respectively, and connecting the braces 58 and 60 of the other trailer unit to its towbar 36 at bosses 52a and 48b, to assume the configuration shown in FIG. 1 and by the alternate position lines in FIG. 2. In this configuration of the towbars 36, they are disposed inclined toward each other and with respect to the axes 25, as shown, and are adapted to be connected to a dual trailer coupler and towbar extension member 98 having spaced apart rectangular cross section tubular sleeve portions 100 and 102 disposed at a suitable angle with respect to each other and a transverse beam portion 103 for receiving respective distal ends 54 of the towbars 36 in sleeved relationship therein and connected thereto by retaining pins The member 98 also includes a towbar extension 105 connected to a coupler 56 for connection to a coupler ball or other suitable hitch member, not shown.

Accordingly, when the trailer towbars 36 are connected to the coupler and towbar extension member 98 and to their respective braces 58 and 60 in the manner illustrated in FIG. 1, and as indicated by the alternate position lines in FIG. 2, the trailer units 14 may be operated as a dual trailer unit 12. When the towbars 36 are connected to their respective braces 58 and 60, as indicated by the solid lines in FIG. 2, each trailer unit 14 may be operated independent of the other trailer unit. The towbars 36, of course, each require use of a single coupler 56 when operated independently.

In order to increase the rigidity of the trailer unit 12 when the individual trailer units 14 are interconnected by the coupler and extension member 98, the respective frames 16 are interconnected to each other to cause the frames 16 to function as a single frame, to reduce stresses on the towbars 36 and their associated braces 58 and 60 and to minimize articulation of one trailer unit 14 relative to the other. Referring to FIGS. 1 through 5, each of the frames 16 is provided with spaced apart generally rectangular tubular sleeves 110, suitably connected to the rearward frame members 30 on the underside thereof, as shown in FIG. 1, and also to the forward frame members 30 in the same manner. When the trailer frames 16 are aligned with each other in the manner shown in FIGS. 1 and 2, the sleeves 110 of each frame are also aligned with the sleeves of the other frame 16 to receive a generally rectangular cross section tubular beam 112 therein, respectively.

Figure 5:
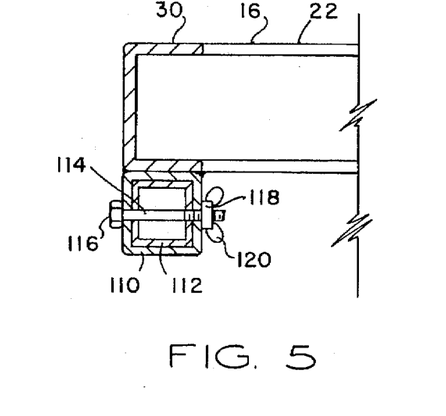
FIG. 5 is a detail view of one of the transverse beam-to-frame connections taken from line 5—5 of FIG. 2.

As shown in FIG. 5, each of the sleeves 110 is provided with a suitable bore for receiving a fastener assembly comprising a threaded bolt 114 having a suitable head portion 116 and a removable nut 118, preferably having manually engageable wing portions 120, for rapidly tightening and loosening the nut to secure the beams 112 in or remove them from the sleeves 110. Accordingly, when the trailer units 14 are disposed side by side and interconnected through their respective towbars 36 and the coupler and extension member 98, the beams 112 may be removably disposed in the retaining sleeves 110 and suitably secured thereto by the fastener assemblies 114, 116, 118. In this way, relative movement of the trailer frames 16 is minimized and the frames 16 are interconnected to function as a single frame. The beams 112 may only require to be connected to adjacent sleeves 110 on the respective frames 16. However, by providing sleeves 110 at each end of the frame members 30, the trailers 14 may be aligned side by side in either combination of alignments.

Figure 3:
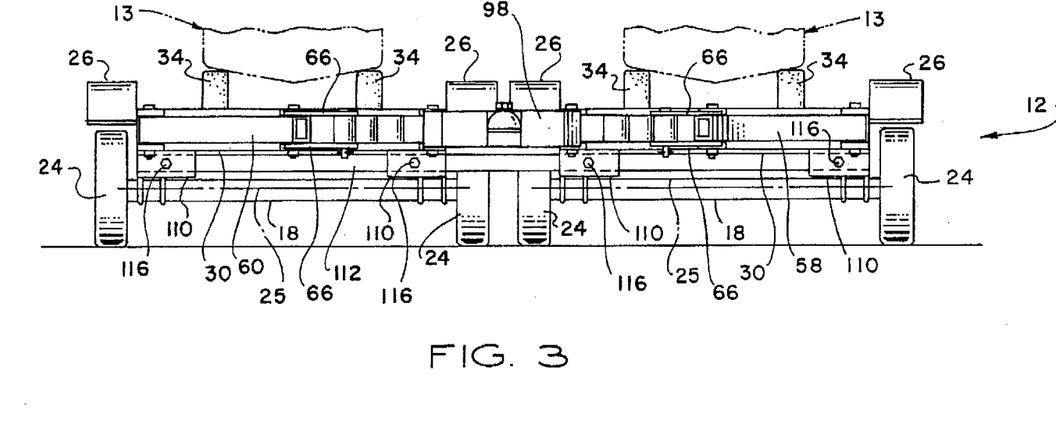
FIG. 3 is a front elevation of the dual trailer.
Figure 4:
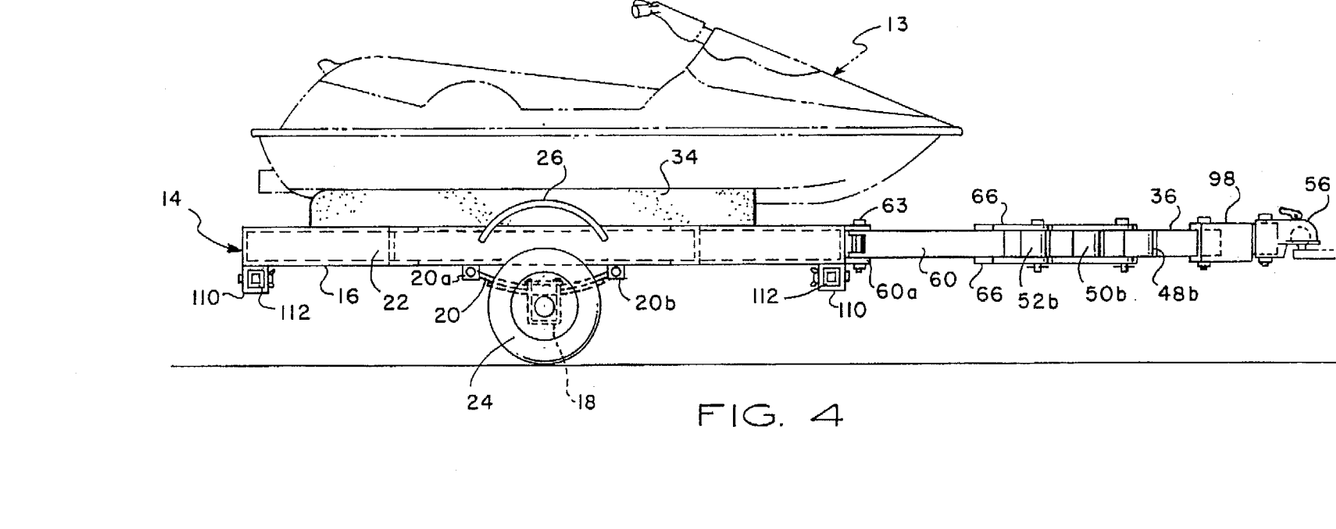
FIG. 4 is a side elevation of the dual trailer.

Accordingly, the trailer unit 12 may be operated as a single trailer to carry two cargoes such as at least two recreational vehicles comprising personal watercraft 13, shown in FIGS. 3 and 4, or other vehicles such as snowmobiles, motorcycles or any cargo that is capable of being transported by the trailers. Suitable frame means, not shown, may be connected to the bunks 34 to provide a platform, for example, to haul miscellaneous types of cargo, not shown. Alternatively, the trailer unit 12 may be separated into individual trailer units 14 by reconnecting the towbars 36 into the configuration shown by the solid lines in FIG. 2 whereby these trailers may be operated independently once the beams 112 are removed from the beam receiving sleeves 110.

As indicated above, the trailer units 14 may be constructed using conventional engineering materials such as square or rectangular cross section tubing for the towbars 36, the braces 58 and 60, the beams 112 and the beam receiving sleeves 110. In like manner, the frames 16 may be constructed of materials and shapes described above. The cross sectional shape of the frame members may be modified to be cylindrical, for example, and the rearward transverse members 30 may be constructed of cylindrical or rectangular cross section tubing and adapted to receive the connecting beams 112 of suitable cooperable cross sectional shape directly rather than utilizing the underslung sleeves 110.

Moreover, the connecting elements formed at the connection points between the frame 16, the towbar 36 and the braces 58 and 60 may be modified in certain ways while retaining a pivot type connection between these elements. By providing opposed sets of connecting bosses spaced apart along the towbars 36 the position of the respective trailers 14 may be interchanged so that regardless of which trailer 14 is disposed on the left or the right, the trailers may be interconnected to form the dual trailer unit 12. The inboard adjacent wheels 24 may be removed when the trailer units 14 are connected to form the dual trailer 12 to improve tracking and stability on certain roadways. Alternatively, the beams 112 may be proportioned to be elastically deflectable to permit some lateral flexing of each frame relative to the other if the inboard wheels encounter a roadway crowned portion, for example.

Figure 11:
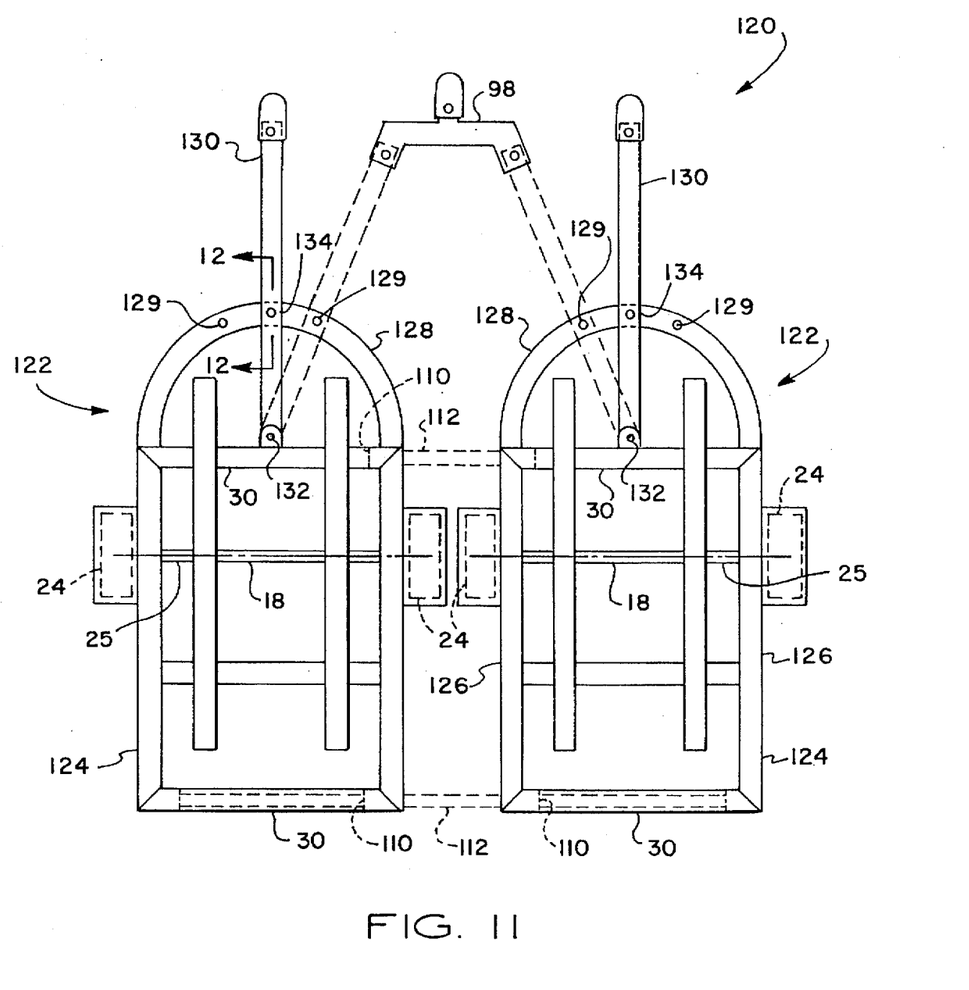
FIG. 11 is a plan view of a first alternate embodiment of a dual trailer unit in accordance with the invention.
Figure 12:
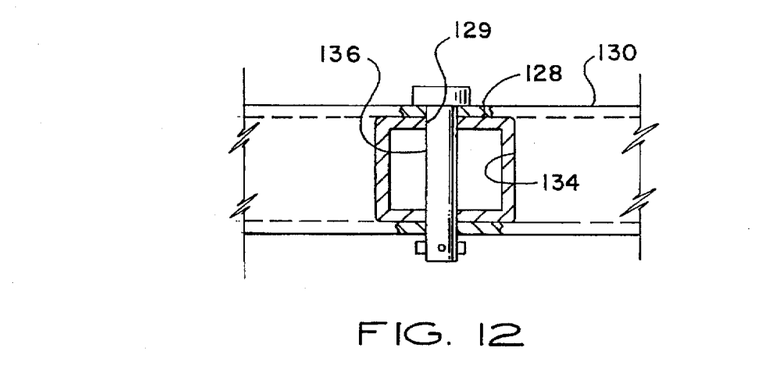
FIG. 12 is a detail section view taken along the line 12—12 of FIG. 11.

Referring now to FIGS. 11 and 12, a first alternate embodiment of a separable dual trailer in accordance with the invention is illustrated and generally designated by the numeral 120. The dual trailer unit 120 includes separable individual trailers 122 which are characterized by generally rectangular perimeter frames 124, similar to the frames 16, but including longitudinal frame members 126 which may be of less overall length than the frame members 22 of the frames 16. The frames 124 include, respectively, fixed arcuate brace members 128 extending forward from the frames 124, as illustrated, and preferably formed of generally rectangular or square cross section tubing suitably secured to the transverse frame members 30 such as by welding.

Each trailer unit 122 has an elongated towbar 130 pivotally connected to the frame 124 at a suitable pivot connection 132. The towbar 132 may comprise a square cross section tubular beam provided with a transverse opening 134, FIG. 12, therethrough to receive the brace member 128. Each brace member 128 has spaced apart pin receiving bores 129 formed therein for receiving a towbar retaining pin 136, FIG. 12, for retaining the towbar 130 in a working position generally normal to the axis 25 or at an inclined angle, as illustrated in FIG. 11 whereby the respective towbars 130 may be connected to a towbar extension and a coupler member 98 in the same manner that the towbars 36 are connected to the towbar extension and coupler member. The trailer frames 124 may be interconnected by transverse beams 112 slidably disposed in cooperating beam receiving sleeve members 110 disposed on the frames 124 in the same manner that the sleeves are disposed on the frames 16. Accordingly, the trailer unit 120 may be operated as a separable dual trailer in the same manner as the trailer unit 12 by merely repositioning the towbars 130 of the individual trailers 122 between the positions shown by the solid lines in FIG. 11 and the positions shown by the alternate position lines.

Figure 13:
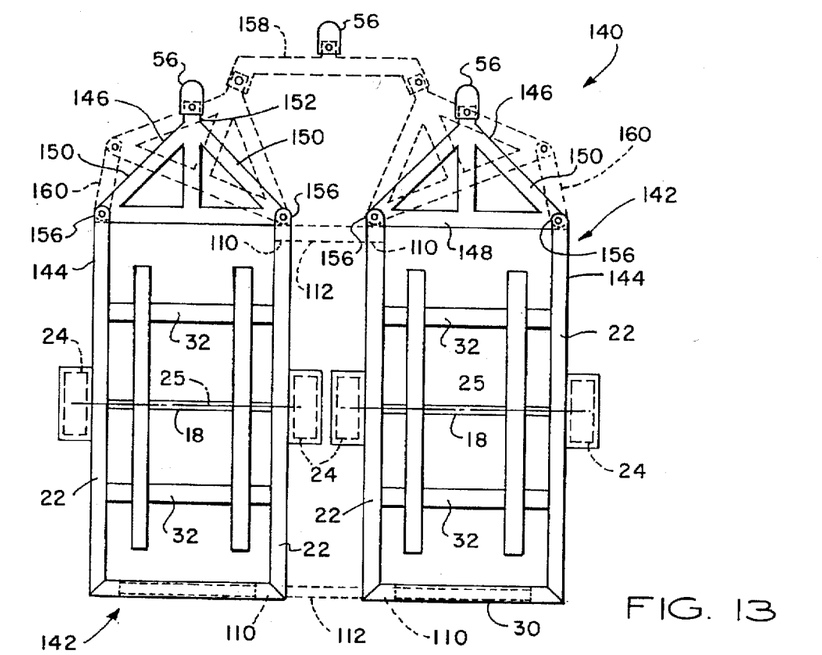
FIG. 13 is a plan view of a second alternate embodiment of a separable dual trailer.

FIG. 13 is a plan view of a second alternate embodiment of a separable dual trailer in accordance with the invention and generally designated by the numeral 140. The separable dual trailer unit 140 is made up of individual trailer units 142 having respective ladder type frames 144 similar in some respects to the frames 16 and 124 and made up of a rear transverse frame member 30, longitudinal frame members 22 and intermediate transverse frame members 32. The trailers 142 each include a towbar assembly 146 which preferably comprises a transverse beam portion 148, opposed inclined brace members 150 and a coupler 56 which may be removably connected to a towbar extension portion 152. The couplers 56 are each removably connected to the respective towbar extension portions 152 in the same manner as the couplers are connected to the towbars 36.

A somewhat modified towbar extension member 158, similar to the towbar extension member 98, is adapted to be connected to the respective towbar assemblies 146 when they are placed in an alternate working position as illustrated by the alternate position lines in FIG. 13. The towbar assemblies 146 are connected to the forward ends of the respective beam members 22 at respective clevis type pivot connections 156. When the towbar assemblies 146 are placed in an alternate working position for connection to the towbar extension and coupler 158 a removable brace member 160 is connected between the outboard pivot connection 156 of each trailer unit 142 and the adjacent corner of the towbar assembly 146, as indicated in FIG. 13. Accordingly, when the embodiment illustrated in FIG. 13 is operated as a dual trailer unit the towbar assemblies 146 are positioned as shown by the alternate position lines, the removable brace members 160 are interconnected between the outboard pivot connections 156 and the adjacent corner of the towbar assemblies and the couplers 56 are removed from the respective towbar assemblies for replacement by the towbar extension and coupler 158. The frames 144 are also adapted to receive and be secured to the transverse beam members 112, which are sleeved within respective sleeves 110 connected to the frames 144 in the same manner as the sleeves 110 are connected to the frames 16.

Figure 14:
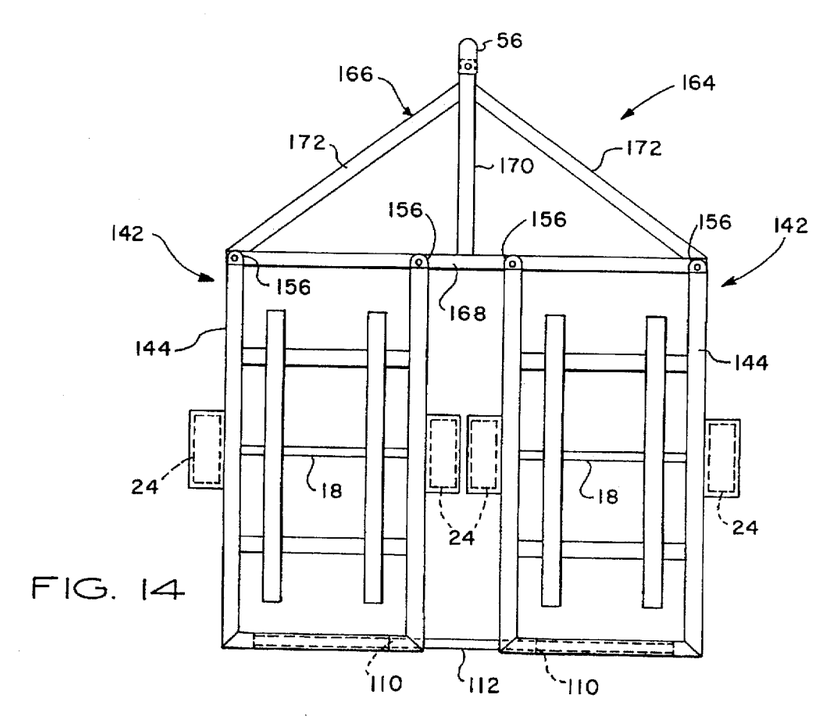
FIG. 14 is a plan view of a third alternate embodiment of a separable dual trailer.

FIG. 14 shows yet another embodiment of a dual separable trailer in accordance with the invention wherein respective individual trailer units 142 are connected for operation as a dual trailer unit 164 by removing the towbar assemblies 146 entirely from the frames 144 of the trailer units 142 and replacing the towbar assemblies with a towbar assembly 166 including a transverse beam member 168 which may be connected to the frames 144 at the respective clevis connections 156 by suitable pin means of a type as illustrated in FIGS. 6, 7, or 8, for example.

The towbar assembly 166 includes a longitudinal towbar member 170 and opposed brace members 172 which are interconnected between the towbar 170 and the transverse beam 168. A suitable coupler 56 is connected to the distal end of the towbar 170. The above described members of the towbar assembly 166 may be suitably secured to each other, permanently, such as by welding, or the like. Accordingly, the embodiment of a dual trailer as shown in FIG. 14 may utilize a single dual trailer towbar assembly in place of altering the positions of the individual trailer towbar assemblies by adding the appropriate braces 160 and the towbar extension member and coupler 56, 158 of the embodiment of FIG. 13. Moreover, the single towbar assembly 166 eliminates the need for the forward transverse beam 112, although a rear transverse beam 112 is preferably used in conjunction with connecting the respective trailers 142 to each other to form the dual trailer unit 164.

Figure 15:
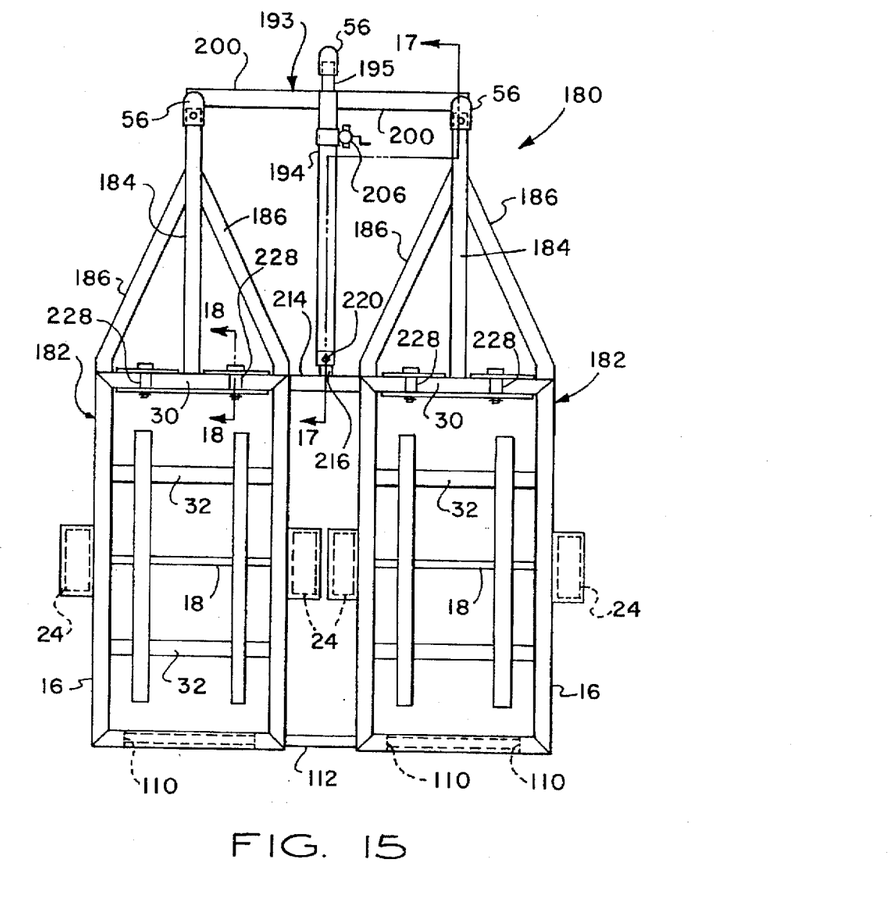
FIG. 15 is a plan view of a fourth alternate embodiment of a separable dual trailer.
Figure 16:
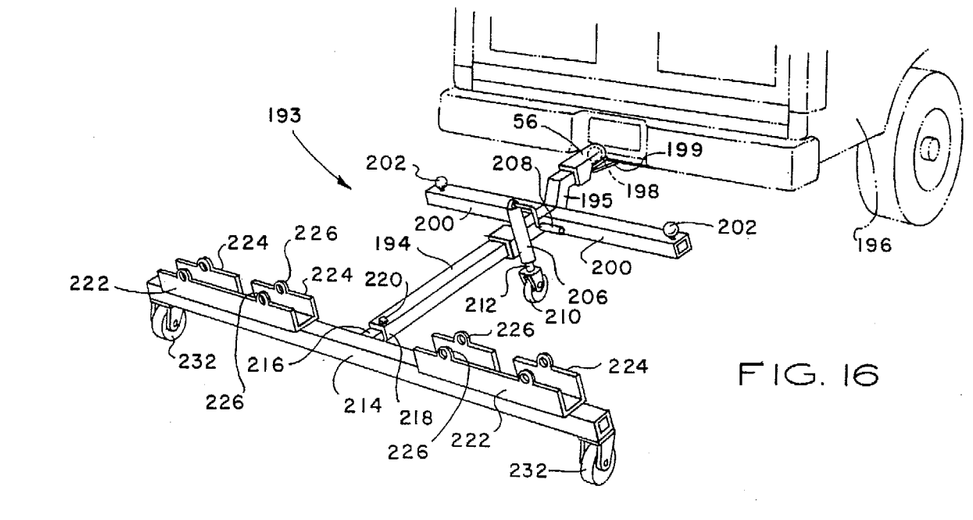
FIG. 16 is a perspective view of the coupler and towbar assembly for the embodiment shown in FIG. 15.

Referring now to FIGS. 15 and 16, a fourth alternate embodiment of a separable dual trailer is illustrated and generally designated by the numeral 180. The dual trailer 180 is made up of individual trailer units 182 which have perimeter frames 16 and fixed towbars secured to the forward transverse frame members 30, respectively, and comprising a towbar 184 and opposed braces 186 interconnecting the towbar with the frame 16. Each towbar 184 is adapted to have a coupler 56 secured to its distal end, as shown. Accordingly, the trailer units 182 may be operated independently of each other, as described for the previous embodiments, and, when it is desired to assemble the trailer units 182 to form the dual trailer 180, one of the transverse beams 112 is secured across the rear of the frames 16 in the same manner as for the trailer unit 12 and a towbar and coupler assembly 193 is adapted to interconnect the trailers 182 at the forward ends thereof, respectively. The towbar assembly 193 includes an elongated tongue or towbar member 194 having a forward, preferably upwardly stepped, adapter part 195 for connection to a coupler 56. As shown in FIG. 16, the coupler 56 is adapted to be connected to a tow vehicle 196 by way of a conventional coupler ball 198 secured to a rear frame member 199 of the vehicle. The vehicle 196 may be a conventional roadable automotive vehicle, for example.

The towbar assembly 193 further includes opposed transversely extending hitch members 200, each of which has a conventional coupler ball member 202 supported on an outer distal end thereof. A conventional trailer towbar or tongue jack assembly 206 is also connected to the towbar member 194 just rearward of the hitch members 200 for elevating the towbar assembly 193 in a manner to be described in further detail herein. The jack assembly 206 includes a conventional crank handle 208 and a caster wheel 210 supported on a telescoping jack member 212, again, in a conventional arrangement and including mechanism known to those skilled in the art.

FIG. 16 further illustrates a separable part of the towbar assembly 193 including a transverse beam 214 adapted to be secured tot he rearward end of the towbar 194 by a forward projecting stub member 216 which is operable to be disposed in sleeved relationship within the distal end 218 of a generally rectangular cross section tube member comprising the tow bar 194. A suitable removable pin assembly 220 is operable to connect the stub part 216 of the transverse beam 214 to the towbar 194, see FIG. 17 also. The beam 214 includes spaced apart pairs of opposed upstanding flanges 222 and 224 forming channels for receipt of the transverse forward beam members 30 of the frames 16 of the respective trailers 182. Spaced apart bosses 226 are formed on the respective flanges 222 and 224 for registration with cooperating pin receiving bosses 228 disposed spaced apart along a top surface of each of the beams 30, see FIGS. 15, 17 and 18. A retaining pin 229 is adapted to be removably inserted through suitable bores in the bosses 226 and 228 as shown in FIG. 18, in particular. Referring further to FIG. 16, the towbar assembly 193 also includes spaced apart caster wheels 232 supported on and adjacent the respective opposite ends of the beam 214, as illustrated. The beam member 214 may be modified to be inverted and secured to the frame members 30 from the top side thereof and then secured to the towbar 194. The beam member 214 may also be modified to engage the towbars 184, respectively, and/or the brace members 186, in place of engagement with the frame members 30.

The towbar assembly 193 may be stored disassembled by separating the beam 214 from the towbar 194 by removal of the pin or fastener assembly 220. The overall width of the beam 214 is greater than the overall width of the towbar assembly comprising only the towbar 194 and the hitch members 200. Accordingly, storage of the towbar assembly with the beam 214 disconnected from the towbar 194 may be more convenient in many garages and other storage facilities.

However, when it is desired to utilize the towbar assembly 193 to connected the trailers 182 for operation as a dual trailer unit 180, as shown in FIG. 15, the transverse beam 214 is connected to the towbar 194 and, preferably, the towbar 194 is connected to the tow vehicle 196 by way of the coupler 56 connected to the coupler ball 198. The jack 206 is operated to retract its caster wheel 210 sufficiently to allow the caster wheels 232 to engage the ground surface for towing the towbar assembly 193. The individual trailer units 182 are then maneuvered into position and connected to the respective coupler balls 202 by way of the couplers 56 and the towbars 184 of each trailer unit. In order to align the trailer units 182 for operation as a dual trailer unit, the tow vehicle 196 is preferably moved forward a sufficient distance to allow the respective trailers 182 to trail along and align with each other in parallel fashion. Once the trailers 182 are aligned as illustrated in FIG. 15, the trailer frames 16 are interconnected by the rear transverse beam 112 by sliding the beam into the sleeves 110 and securing the beam with the fasteners 116 in the same manner as illustrated and described for the trailer embodiment 12.

Figure 17:
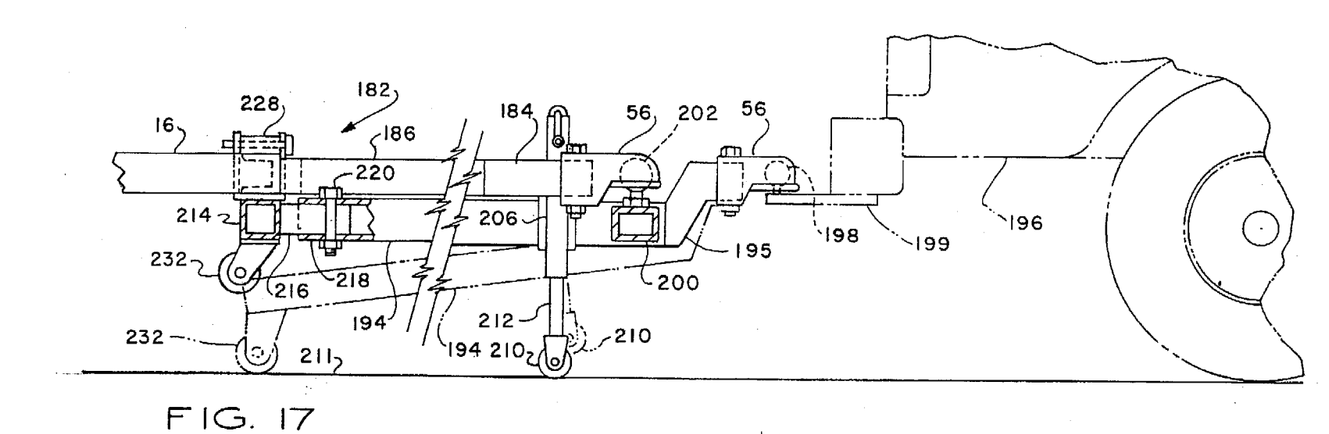
FIG. 17 is a section view taken generally along the line 17—17 of FIG. 15.
Figure 18:
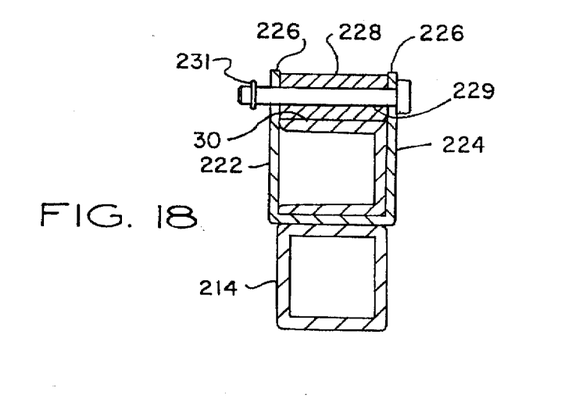
FIG. 18 is a section view taken along the line 18—18 of FIG. 15.

Once the trailers 182 are aligned in the manner illustrated in FIG. 15 and interconnected by the beam 112, the tongue jack 206 is operated to effect lifting of the towbar assembly 193 to the position shown by the solid lines in FIG. 17 by extending the telescoping jack member 212 so that the towbar assembly pivots about the coupler 56 connected to the coupler ball 198. As the towbar assembly 193 is raised to the position shown in FIG. 17, the pairs of flanges 222 and 224 will slide into their working positions with the forward transverse beams 30 of the frames 16 disposed therebetween. Once the trailer frame members 30 are fully nested in the channels formed by the flanges 222 and 224, the retaining pins 229 are inserted through the bosses 226 and 228 and suitably locked by removable hairpin type retaining keys 231 or other suitable means, not shown. The trailer frames 16 are thus now secured to each other at both their fore and aft ends and the towbars 184 are also secured to the towbar assembly 193, of course. The tongue jack 206 is then operated to retract the telescoping jack member 212 upward so that the caster wheel 210 will clear the ground surface in virtually all operating conditions of the trailer 180. It may not always be necessary to use or provide the transverse beam 112 in that the individual trailers 182 may be properly secured together and towed only by the towbar and coupler assembly 193.

When it is desired to separate the trailers 182 from each other, the above-described process is essentially carried out in reverse order to permit separation of the trailers. It is not, however, necessary to move the tow vehicle in all instances, to disconnect the trailers 182 from each other.

The above described embodiments of the invention illustrated in FIGS. 11 through 18 are also constructed using conventional engineering materials such as may be used for constructing the embodiment described and shown in FIGS. 1 through 10. Those parts of the trailer embodiments shown in FIGS. 11 through 18 which are common to the embodiment of FIGS. 1 through 10 have not been described in detail in the interest of clarity and conciseness.

Although preferred embodiments of the invention have been described in detail herein, those skilled in the art will recognize that various substitutions and modifications may be made without departing from the scope and spirit of the appended claims.

What is claimed is:

1. A trailer towbar assembly for use in towing two separate semitrailers by a tow vehicle and interconnected, side by side, to form a dual trailer unit, said towbar assembly comprising:

an elongated towbar member including a coupler connected to one end thereof for connection to a tow vehicle;

opposed transversely extending hitch members connected to and extending from opposite sides of said towbar member, each of said hitch members including coupler means disposed thereon for connection to respective coupler means connected to each of said trailers; and a member connected to an opposite end of said towbar member and extending transversely on opposite sides of said towbar member and including means thereon for releasably engaging respective frame means of each trailer for interconnecting said frame means with said towbar assembly.

2. The towbar assembly set forth in claim 1 wherein:

said means for releasably engaging said frame means comprises spaced apart channel members disposed on said member connected to said opposite end of said towbar member and operable, respectively, to receive frame members of said trailers.

3. The towbar assembly set forth in claim 1 including:

spaced apart wheels connected to said towbar assembly for towing said towbar assembly in a first position for aligning said trailers when said trailers are connected to said respective hitch members.

4. The towbar assembly set forth in claim 1 including:

an elevating jack connected to said towbar assembly for moving said towbar assembly between first and second positions for engagement of said means for releasably engaging said frame means of said trailers and disengagement from said frame means of each of said trailers respectively.

5. The towbar assembly set forth in claim 2 including:

removable pin means engageable with said channel members and operable to retain said frame members engaged with said channel members, respectively.

6. A method for connecting two separate semitrailers together for operation as a dual trailer unit for towing behind a tow vehicle, each of said semitrailers including a frame and a trailer towbar extending forward from said frame, said method comprising steps of:

providing a towbar assembly adapted to be connected to a tow vehicle, said towbar assembly including a towing coupler at one end of said towbar assembly for connection to said tow vehicle, opposed hitch members connected to said towbar assembly and including trailer couplers for connecting said towbar assembly to said trailer towbars, respectively, and means engageable with the frames of each of said trailers, respectively;

connecting said trailer towbars to said trailer couplers of said towbar assembly; respectively;

aligning said trailers side by side and substantially parallel to each other by moving said towbar assembly with said trailers connected thereto to allow said trailers to move into substantially parallel positions with respect to each other; and moving said towbar assembly with respect to said trailer frames to interconnect said trailer frames with said means.

7. The method set forth in claim 6 wherein: said trailer frames are interconnected by elevating another end of said towbar assembly including said means into a position to engage said trailer frames.

8. A roadable trailer operable to be towed by a tow vehicle, said trailer being adapted to be operated as a dual trailer unit and as two separate trailer units, said trailer comprising:

a pair of side by side trailer frames, each frame including a towbar extending forwardly thereon and each frame being supported on spaced apart roadwheels; and a towbar assembly for coupling said frames to said tow vehicle including an elongated towbar member having a first coupler member attached to one end for connecting said towbar assembly to said tow vehicle, opposed transversely extending hitch members connected to said towbar member at a point spaced from said first coupler member, each of said hitch members including a trailer coupler supported thereon for connecting respective ones of said towbars connected to said trailer frames to said towbar assembly, and a member connected to said towbar member at an end opposite said first coupler member and extending transversely in opposite directions with respect to said towbar member and including means for releasably engaging respective ones of said trailer frames for interconnecting said trailer frames to form said dual trailer unit.

9. The trailer set forth in claim 8 wherein:

said towbar assembly includes wheel means disposed said member extending transverse to said elongated towbar member for maneuvering said towbar assembly.

10. The trailer set forth in claim 8 wherein:

said towbar assembly includes an elevating jack, connected thereto for moving said towbar assembly to a position to engage said towbar assembly with said frames, respectively.

11. The trailer set forth in claim 8 wherein:

said transversely extending member includes means for releasably connecting said transversely extending member to said towbar member at said end opposite said first coupler member.

12. The trailer set forth in claim 8 including:

a transversely extending beam adapted to be connected to respective ones of said trailer frames at a position on said trailer frames, respectively, spaced from said transversely extending member to substantially prevent excursion of one trailer frame relative to the other trailer frame when said towbars are interconnected to said towbar assembly for operation as said dual trailer unit.

13. The trailer set forth in claim 12 wherein:

said beam is interconnected to said trailer frames by respective removable fasteners.

14. The trailer set forth in claim 12 wherein:

each of said trailer frames includes sleeve means supported thereon for receiving said beam slidably disposed therein, and fastener means for interconnecting said sleeve means to said beam to substantially rigidly interconnect said trailer frames for operation as said dual trailer unit.

* * * * *